United States Patent
Kawano

[11] Patent Number: 6,154,628
[45] Date of Patent: Nov. 28, 2000

[54] IMAGE FORMING DEVICE WITH MISREGISTRATION CORRECTION ACHIEVED BY PHOTO-CONDUCTOR SPEED CONTROLLED VARIATION OF LATENT IMAGE TILT

[75] Inventor: Yuzo Kawano, Fukuoka, Japan

[73] Assignee: Matsushita Electric Industrial Co., Ltd., Osaka, Japan

[21] Appl. No.: 09/308,750

[22] PCT Filed: Sep. 14, 1998

[86] PCT No.: PCT/JP98/04142

§ 371 Date: May 24, 1999

§ 102(e) Date: May 24, 1999

[87] PCT Pub. No.: WO99/17169

PCT Pub. Date: Apr. 8, 1999

[30] Foreign Application Priority Data

Sep. 29, 1997 [JP] Japan ................................ 9-263129
Oct. 2, 1997 [JP] Japan ................................ 9-269560

[51] Int. Cl.$^7$ ............................ G03G 15/01; B41J 2/385; B41J 2/435; B41J 2/47; G01D 15/06
[52] U.S. Cl. ......................... 399/301; 347/115; 347/232; 399/179; 399/299
[58] Field of Search ..................... 399/299, 300, 399/298, 9, 301, 179; 347/115, 172, 232, 129, 225, 116, 117

[56] References Cited

U.S. PATENT DOCUMENTS

| 4,752,804 | 6/1988 | Ohno | 399/300 |
| 4,903,067 | 2/1990 | Murayama et al. | 347/129 |
| 5,508,789 | 4/1996 | Castelli et al. | 399/9 X |

FOREIGN PATENT DOCUMENTS

| 1-284870 | 11/1989 | Japan . |
| 6-250474 | 9/1994 | Japan . |
| 8-234532 | 9/1996 | Japan . |
| 9-146329 | 6/1997 | Japan . |

*Primary Examiner*—Susan S. Y. Lee
*Attorney, Agent, or Firm*—Pearne & Gordon LLP

[57] ABSTRACT

As the speed of a photoconductor drum 1a can be independently varied by providing a rotational speed adjustment mechanism to the photoconductor drum 1a, an inclined angle in a diagonal direction can be varied and as a result, misregistration can be adjusted. Also, exposure device with the inclination of a scanning line with the photoconductor drum 1a provided and control over correcting the inclination of the scanning line on the photoconductor drum 1a is executed by control over varying the peripheral speed of the photoconductor drum 1a. Hereby, a multiple image formation device wherein the configuration of color misregistration correction device is simplified is provided as an image formation device used for the output device of a computer and others.

3 Claims, 6 Drawing Sheets

IMAGE FORMING DEVICE WITH MISREGISTRATION CORRECTION ACHIEVED BY PHOTO-CONDUCTOR SPEED CONTROLLED VARIATION OF LATENT IMAGE TILT

TECHNICAL FIELD

The present invention relates to a multiple image formation device wherein a synthetic image can be formed by overlapping image information on transfer material utilizing electrophotography and others.

BACKGROUND ART

Heretofore, in an image formation device adopting electrophotography, an electrophotographic photoconductor as an image carrier is electrified by an electrifier, a latent image is formed by radiating a beam according to image information on the photoconductor, the latent image is developed by a developing machine and the acquired image is transferred on sheet material and an image is formed.

In the meantime, as color printing is demanded, a tandem multiple image formation device wherein plural image carriers for each image formation process are provided, a cyan image, a magenta image, a yellow image, desirably a black image are formed by the respective image carriers and a full color image is formed by overlapping and transferring each color image on sheet material in a transfer position of each image carrier is also proposed.

Such a tandem multiple image formation device is advantageous in speedup because each image formation part is provided every color.

However, there is a problem that it is difficult to satisfactorily register each image formed by different image formation parts. The reason is that the misregistration of four color image formation positions transferred on sheet material finally appears as a irregular color or as the change of a color tone.

For the types of the above misregistration of transfer positions, as shown in FIGS. 5(a), 5(b), 5(c) and 5(d), there are misregistration (a top margin) in a write direction (shown by an arrow A in FIG. 5(a)) on a scanning line on a transfer material 9, misregistration (a left margin) in a scanning direction (shown by an arrow B in FIG. 5(b) perpendicular to the direction shown by the arrow A), misregistration in a diagonal direction shown in FIG. 5(c) and misregistration due to an error of magnification shown in FIG. 5(d) and actually, an image in which the above four types of misregistration is overlapped appears.

The above misregistration is mainly caused by the lag of timing at which each image formation station begin to draw an image in the case of a top margin shown in FIG. 5(a) and by the lag of timing at which each image formation station draws an image in the case of a left margin shown in FIG. 5(b), that is, the lag of timing for the start of scanning on one scanning line.

The misregistration in a tilt in the diagonal direction shown in FIG. 5(c) is caused by misregistration in an angle at which a scanning optical system is arranged or misregistration in the angle of the rotation shaft of a photoconductor drum, and the misregistration due to an error of magnification shown in FIG. 5(d) is caused by difference in the length of a scanning line due to the error of optical path length from the scanning optical system of each image formation station to a photoconductor drum.

To eliminate the above four types of misregistration, first, the quantity of misregistration is corrected by adjusting the scanning timing of each color as to a top margin shown in FIG. 5(a) and a left margin shown in FIG. 5(b). As to the misregistration due to an error of magnification and the misregistration in a tilt, the quantity of misregistration can be corrected by independently adjusting a pair of mirrors 101 and 102 the respective mirror faces of which are held opposite at a right angle out of three folded mirrors 101, 102 and 105 arranged on the way of the optical path of each station shown in FIG. 6 in directions shown by arrows M and N with the body of the device as shown in FIG. 6 by actuators 103 and 104.

For the actuator for the above adjustment, a linear step actuator provided with a step motor which is a driving source for enabling gradual linear movement and others are used.

The above configuration is extremely effective to prevent the misregistration of four colors.

However, according to the above prior configuration, as the configuration of correction means for the misregistration due to an error of magnification shown in FIG. 5(c) and the misregistration in a tilt shown in FIG. 5(d) is particularly complicated and many parts are required for each correction means, the above prior configuration has a defect that the above correction means is readily vibrated. Therefore, there is a problem that a photoconductor is vibrated in the position of a laser beam radiated on the photoconductor, it appears as the nonuniformity of scanning, the nonuniformity of scanning appears as difference in a color tone of an output image and the image is remarkably deteriorated.

The above problem is a very serious problem when an image free of the misregistration of colors and having high quality is to be formed by a digital multicolor image formation device.

The object of the present invention is to provide a multiple image formation device wherein the configuration of misregistration correction means is simplified, the cost is reduced, further, adjustment for misregistration is facilitated and misregistration in each pixel in case images respectively acquired by optical scanning using plural light beams are overlapped is eliminated.

DISCLOSURE OF THE INVENTION

According to the present invention for solving the above problems, speed adjustment means for changing the rotational speed of each image carrier is provided and owing to the above configuration, a multiple image formation device enabling the adjustment of misregistration in a tilt in a diagonal direction can be obtained.

According to another invention of the present invention, exposure means is arranged so that the exposure means scans a photoconductor with a predetermined tilt to a perpendicular direction to the rotational direction of the photoconductor and speed adjustment means for varying the rotational speed of each photoconductor is included, owing to the above configuration, a multiple image formation device wherein the coefficient of variation of the tilt of an image on transfer material to the variation of the rotational speed of each photoconductor is increased, change in rotational speed is minimized and the adjustment of misregistration in a tilt in a diagonal direction is enabled is obtained.

A reference number 1a denotes a photoconductor drum, 2a denotes electrification means, 3 denotes exposure means, 3K denotes a scanning line, 4a denotes developing means, 5a denotes transfer means, 6a denotes cleaning means, 7 denotes an intermediate transfer belt, 8 denotes a paper feed roller, 9 denotes sheet material, 11 denotes a sheet material transfer roller, 12 denotes fixing means and 13 denotes a driving motor.

PREFERRED EMBODIMENTS OF THE INVENTION

First Embodiment

A first embodiment of the present invention will be described below.

The present invention equivalent to the first embodiment relates to a multiple image formation device composed of plural image carriers, plural image formation means for forming an image on each image carrier and speed adjustment means for varying the rotational speed of each image carrier forming a synthetic image on transfer material by sequentially overlapping images held on each image carrier on transfer material wherein misregistration in a tilt in a diagonal direction can be adjusted by varying the rotational speed of each image carrier.

Figure 1:
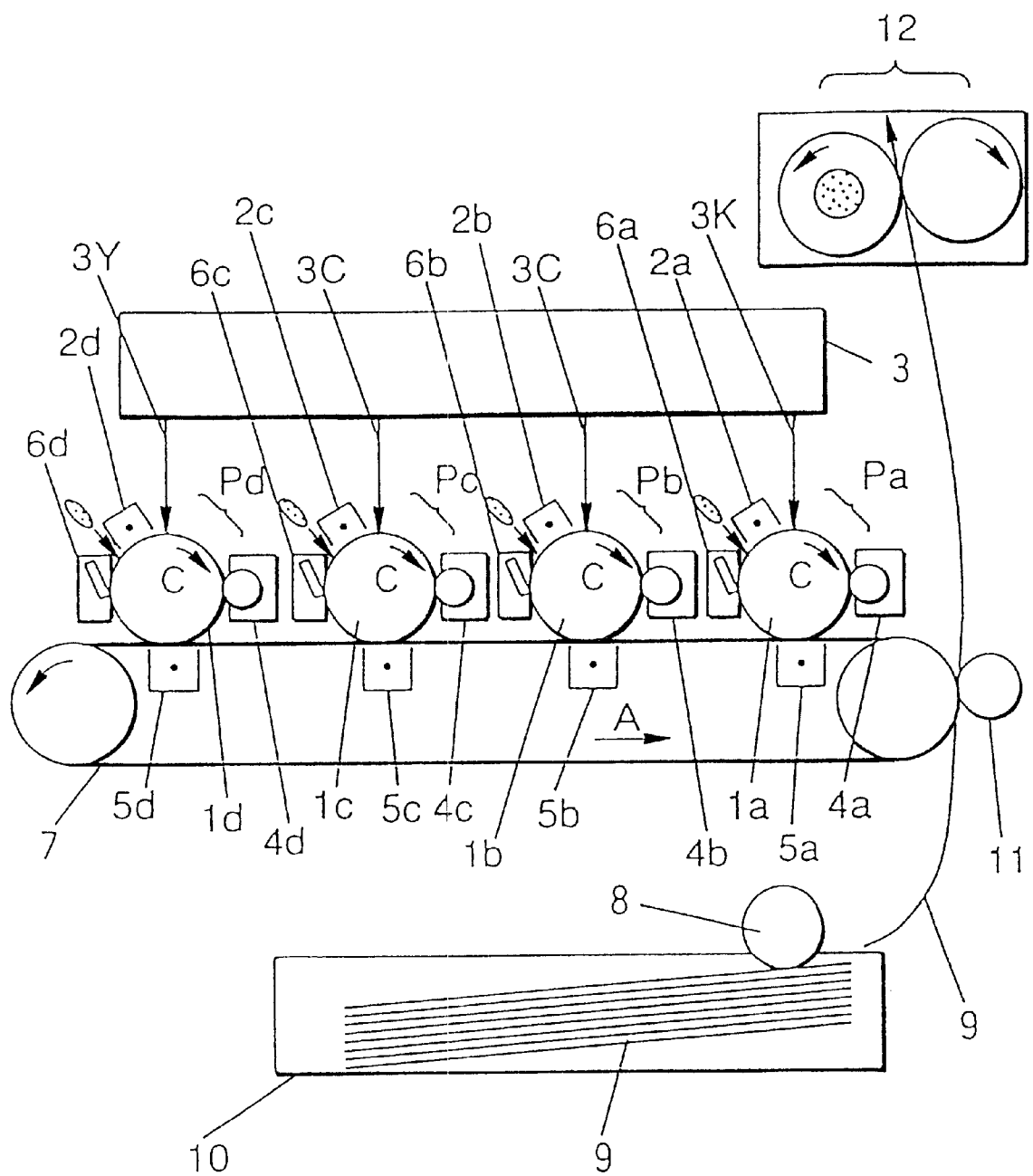
FIG. 1 is a block diagram showing a multiple image formation device equivalent to an embodiment of the present invention.
Figure 2:
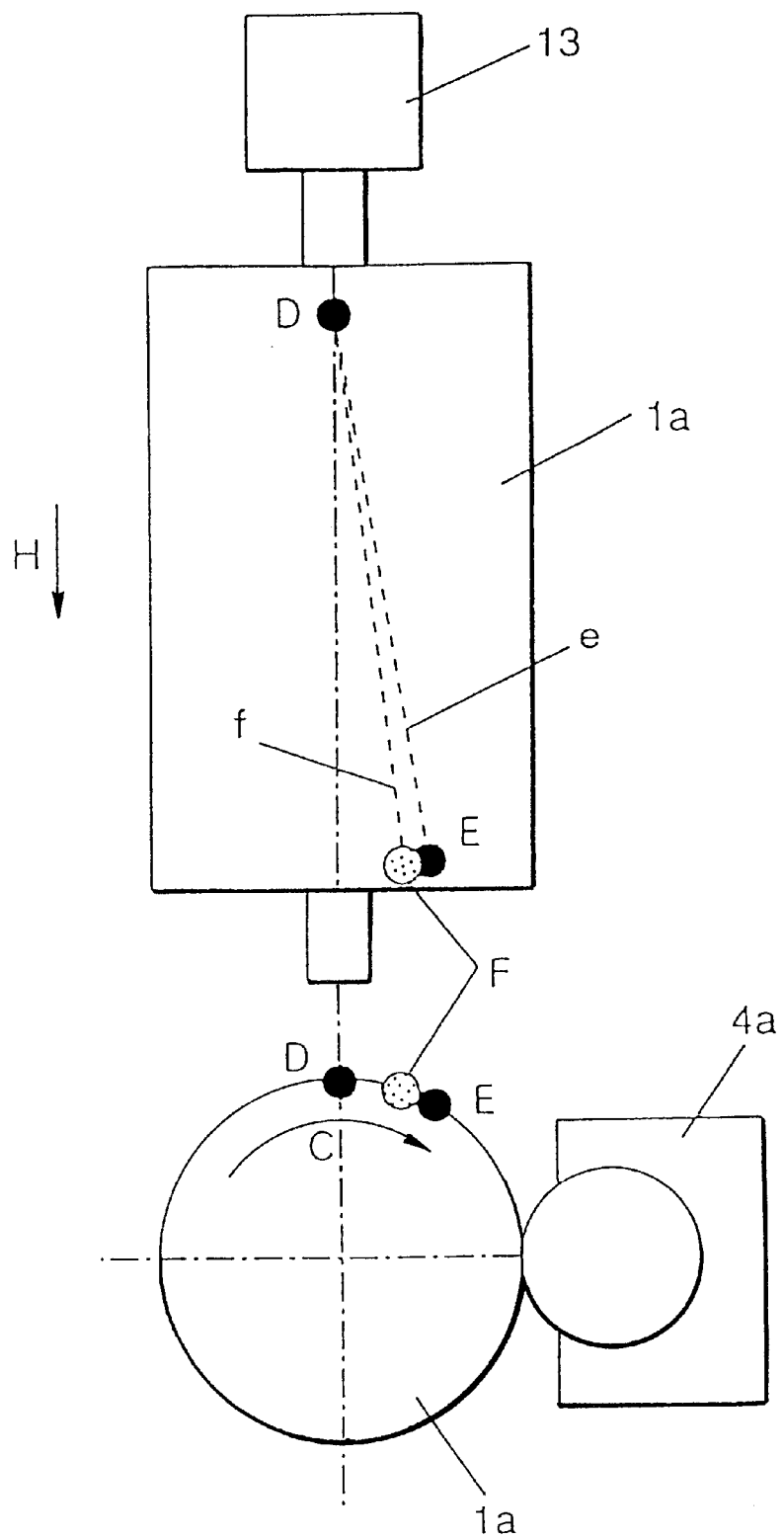
FIG. 2 is a phase diagram showing the correction of misregistration in a write area on an image carrier of the multiple image formation device equivalent to the embodiment of the present invention.
Figure 4:
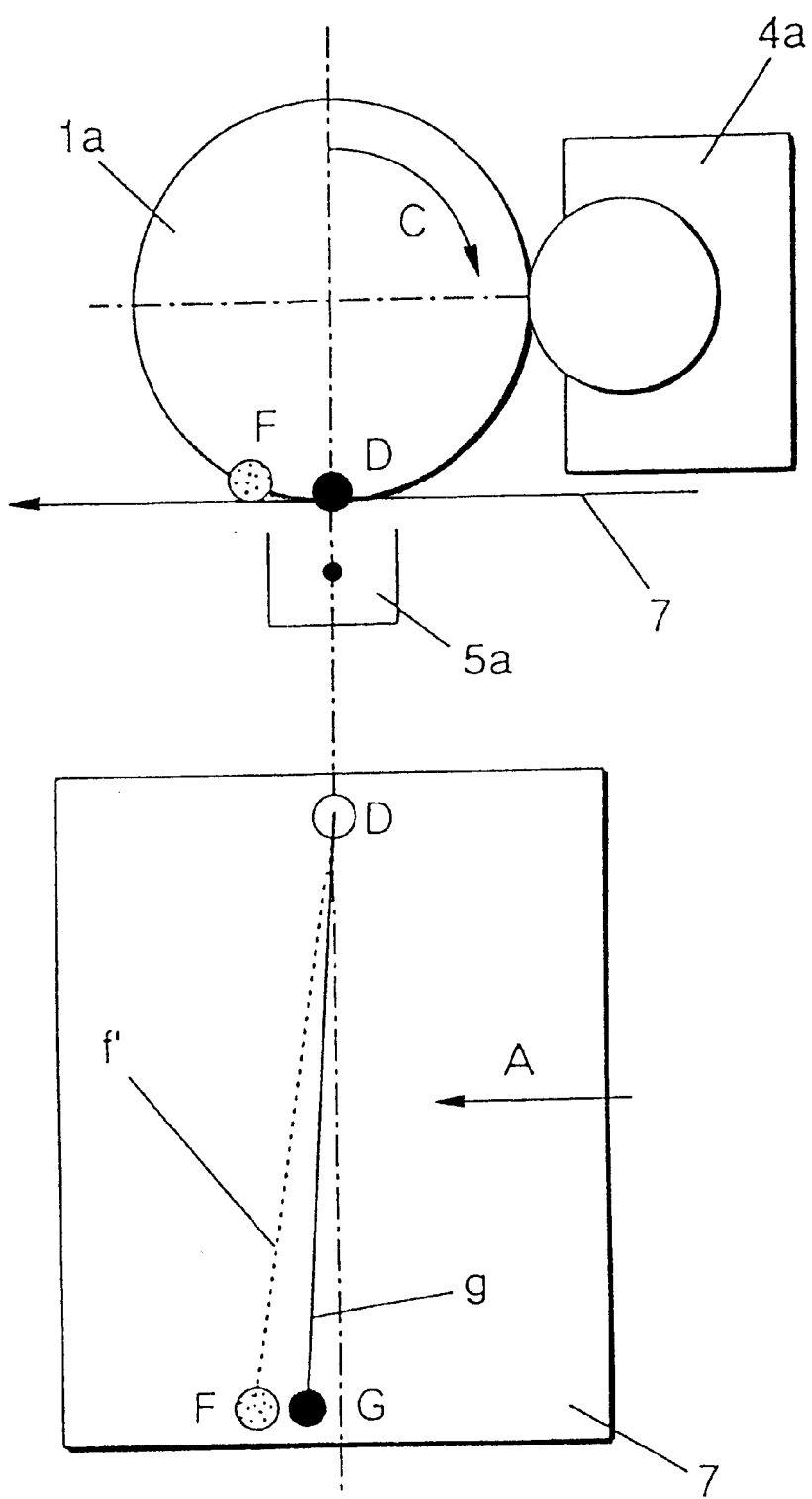
FIG. 4 is a phase diagram showing the correction of misregistration in a transfer belt area of the multiple image formation device equivalent to the embodiment of the present invention.
Figure 5A:
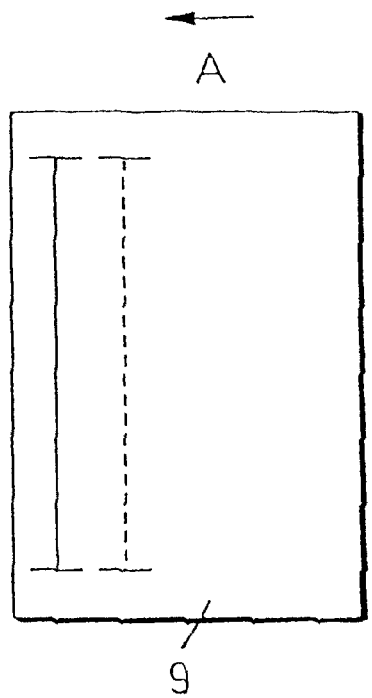
FIGS. 5(a) to 5(d) respectively show an error related to the scanning line of a conventional type multiple image formation device.
Figure 5B:
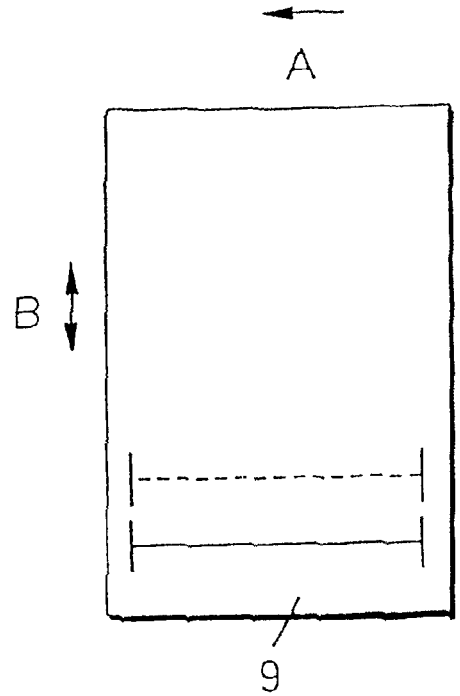
Figure 5C:
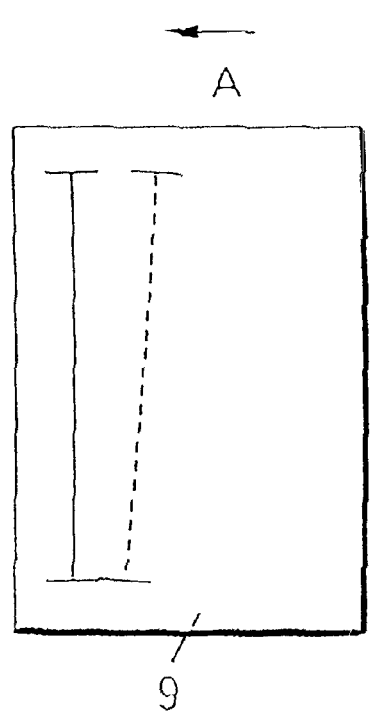
Figure 5D:
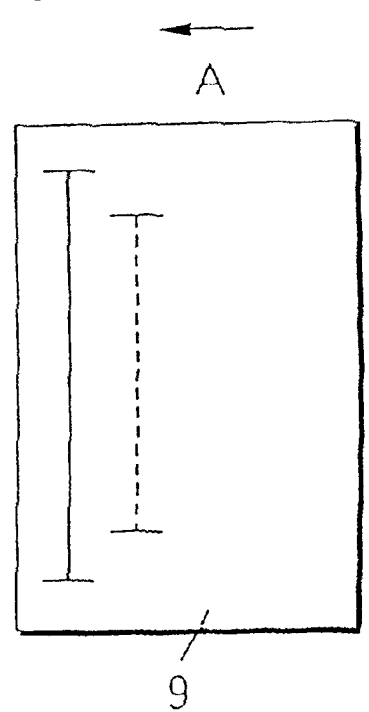
Figure 6:
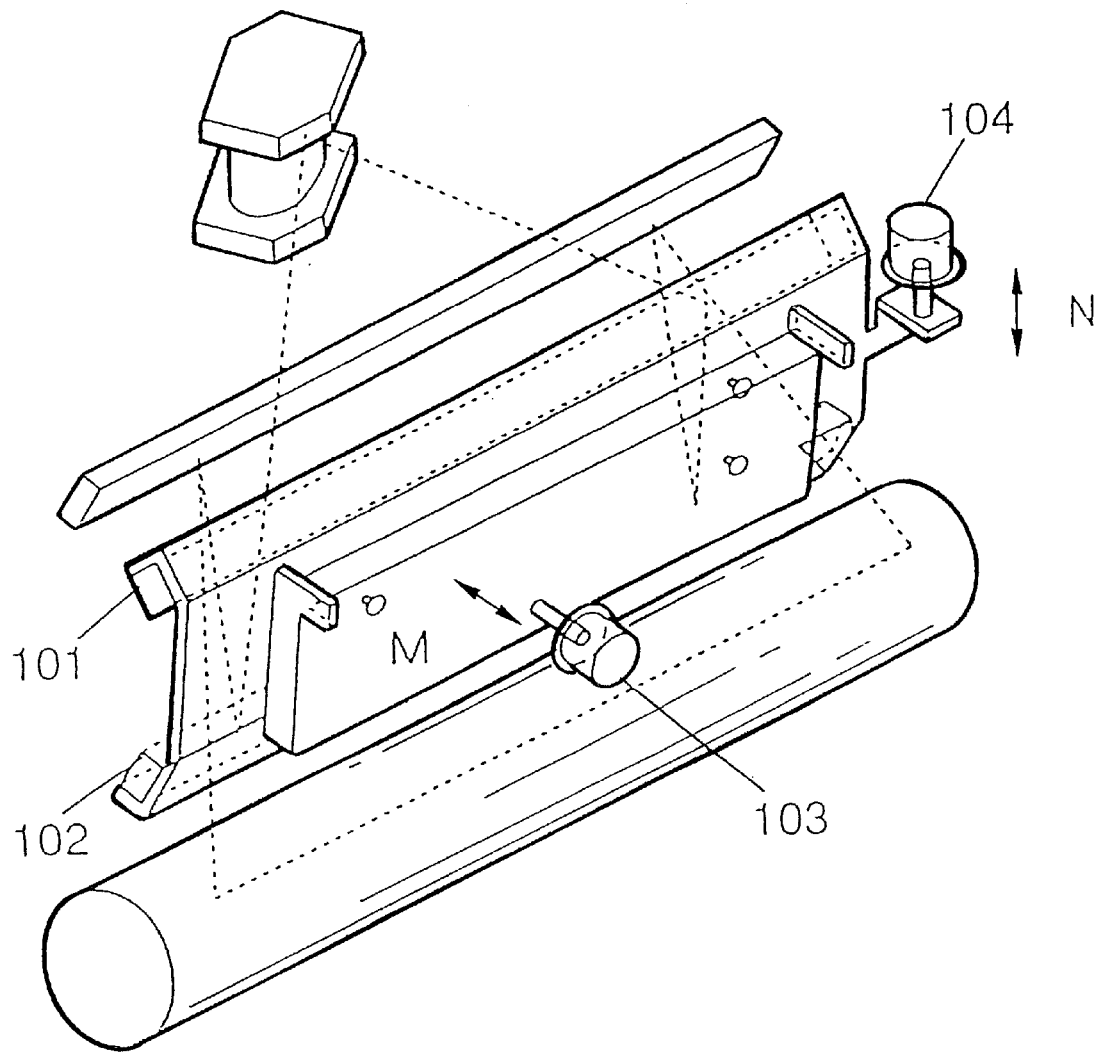
FIG. 6 is a perspective view showing the schematic configuration of a compensator of the conventional type multiple image formation device.

FIG. 1 is a block diagram showing the multiple image formation device equivalent to the first embodiment of the present invention, FIG. 2 is a phase diagram showing the correction of the misregistration of colors in a write area on the image carrier of the multiple image formation device equivalent to the embodiment of the present invention and FIG. 4 is a phase diagram showing the correction of the misregistration of colors in a transfer belt area of the multiple image formation device equivalent to the embodiment of the present invention.

First, as shown in FIG. 1, four image formation stations Pa, Pb, Pc and Pd are arranged in the image formation device and each image formation station Pa, Pb, Pc and Pd is provided with a photoconductor drum 1a, 1b, 1c, 1d as an image carrier.

Each dedicated electrification means 2a, 2b, 2c, 2d, each exposure means 3 for radiating a light beam according to image information on each photoconductor drum 1a, 1b, 1c, 1d, each developing means 4a, 4b, 4c, 4d, each transfer means 5a, 5b, 5c, 5d and each cleaning means 6a, 6b, 6c, 6d are arranged around each photoconductor drum.

The image formation stations Pa, Pb, Pc and Pd respectively form a black image, a cyan image, a magenta image and a yellow image.

In the meantime, an intermediate transfer belt 7 without an end is arranged under the photoconductor drums 1a, 1b, 1c, 1d so that the belt passes each image formation station Pa, Pb, Pc and Pd and is moved in a direction shown by an arrow A.

In such configuration, first, after a latent image in black component color according to image information is formed on the photoconductor drum 1a by the electrification means 2a of the first image formation station Pa and well-known electrophotographic process means such as the exposure means 3, the latent image is visualized as a black toner image with developing material provided with black toner by the developing means 4a and the black toner image is transferred on the intermediate transfer belt 7 by the transfer mean 5a.

In the meantime, while the black toner image is transferred on the intermediate transfer belt 7, a latent image of cyan component color is formed in the second image formation station Pb, next, a cyan toner image is acquired with cyan toner by the developing means 4b, the cyan toner image is transferred on the intermediate transfer belt 7 on which transfer by the first image formation station Pa is finished by the transfer means 5b of the second image formation station Pb and is overlapped with the black toner image.

As to a magenta toner image and a yellow toner image, image formation is executed by the similar method and when the overlap of four color toner images on the intermediate transfer belt 7 is finished, the four color toner images are collectively transferred on sheet material 9 such as paper fed from a paper supply cartridge 10 via a paper feed roller 8 by a sheet material transfer roller 11, are heated and fixed by fixing means 12 and a full color image is acquired on the sheet material 9.

When transfer is finished, residual toner is respectively removed from the respective photoconductor drums 1a, 1b, 1c, 1d by cleaning means 6a, 6b, 6c, 6d and the photoconductor drums are prepared for the next image formation.

As described above, in the device provided with plural image formation stations Pa, Pb, Pc and Pd, image information is respectively exposed on the photoconductor drums 1a, 1b, 1c, 1d rotated in a direction shown by an arrow C in FIG. 1 by each scanning line 3K, 3C, 3M, 3Y of laser beams radiated from laser beam sources in the exposure means 3 and images in different colors are sequentially transferred and overlapped on the same surface of the said intermediate transfer belt 7 carried in the direction shown by the arrow A in FIG. 1 after a well-known image formation process, however, when each transfer image position in the image formation stations Pa, Pb, Pc and Pd is off its ideal position, the result appears as the misregistration or the overlap of images in different colors in the case of a multicolor image. In the case of a color image, the above result appears as difference in hue and when misregistration between transfer image positions is further increased, the result appears as misregistration in color and the quality of an image is remarkably deteriorated.

In this embodiment, to eliminate the four types of misregistration described in the item of a background art, first, for a top margin and a left margin, the scanning timing of the scanning lines 3K, 3C, 3M, 3Y is electrically adjusted as in prior examples and the quantity of misregistration is corrected.

For misregistration due to an error of magnification, the video clock rate of the scanning lines 3K, 3C, 3M, 3Y is electrically modulated and the quantity of misregistration is corrected. Finally, for misregistration in a tilt in a diagonal direction, the quantity of misregistration is corrected by the following method. Referring to FIGS. 2 and 4, a tilt misregistration (skew) correction system according to the present invention will be described below.

The photoconductor drum 1a of the first image station Pa is rotated in a direction shown by the arrow C by a driving motor 13 shown in FIG. 2. On the surface of the photoconductor drum 1a with the same peripheral speed as the moving speed of the intermediate transfer belt 7, a latent image line e in black component color of image information with a tilt beforehand set from a scanning start point D to a scanning end point E in a direction shown by an arrow H is formed by the scanning line 3K of a laser beam. When writing is executed from the scanning start point D to the scanning end point F in case the rotational speed of the driving motor 13 is increased and the peripheral speed of the photoconductor drum 1a is faster than the moving speed of the intermediate transfer belt 7, a latent image line f smaller than the latent image line 3 in inclination is formed.

Next, the latent image line f is visualized by the developing means 4a and is transferred on the intermediate transfer belt 7 as shown in FIG. 4. However, as the peripheral speed of the photoconductor drum 1a is faster than the moving speed of the intermediate transfer belt 7, the inclination of a line acquired by visualizing the latent image line f is reduced up to the tilt of a transfer line g on the intermediate transfer belt 7. (A line f' shown in FIG. 4 is a transfer line in case the peripheral speed of the photoconductor drum 1a and the moving speed of the intermediate transfer belt 7 are equal.) In the meantime, if the rotational speed of the photoconductor drum 1a is slower than the moving speed of the intermediate transfer belt 7, difference between the respective tilts of a latent image line and a transfer line is enlarged.

Hereinafter, for a cyan image, a magenta image and a yellow image, the tilt of a transfer line is also varied by the similar method, images are formed and toner images in four colors are formed on the intermediate transfer belt 7.

As described above, the peripheral speed of the photoconductor drums 1a, 1b, 1c, 1d is varied so that the tilt of the transfer line of each color image is equal by varying the tilt of a transfer line and misregistration in a tilt is corrected. For example, the peripheral speed of the other photoconductor drums 1b, 1c, 1d is independently varied so as to equalize the inclination of the transfer line g of the other photoconductor drums with the inclination of the transfer line g of the photoconductor drum 1a, the quantity of misregistration is corrected by adjusting so that the inclinations are equal and the overlap of toner images in four colors free of misregistration on the intermediate transfer belt is completed.

If the peripheral speed of the photoconductor drums 1a, 1b, 1c is varied based upon the moving speed of the intermediate transfer belt 7, difference made by correcting misregistration in a tilt in speed between the intermediate transfer belt 7 and each photoconductor drum 1a, 1b, 1c, 1d can be minimized.

In the meantime, if the peripheral speed of the photoconductor drums 1a, 1b, 1c, 1d is varied based upon faster speed than the moving speed of the intermediate transfer belt 7, tension is applied to the intermediate transfer belt 7 in a contact part between each photoconductor drum 1a, 1b, 1c, 1d and the intermediate transfer belt 7 because each photoconductor drum 1a, 1b, 1c, 1d tries to rotate faster than the intermediate transfer belt 7 and the disturbance of an image due to the deflection of the intermediate transfer belt 7 can be prevented.

Second Embodiment

Next, a second embodiment of the present invention will be described. The second embodiment of the present invention relates to a multiple image formation device composed of plural photoconductors, exposure means for radiating a light beam on each photoconductor to form a latent image and scanning the above photoconductor with a predetermined tilt to a perpendicular direction to the rotational direction of the photoconductor, plural developing means for respectively developing a latent image formed on each photoconductor, transfer means for transferring the image developed by the developing means on transfer material and speed adjustment means for varying the rotational speed of each photoconductor for sequentially overlapping an image developed on each photoconductor on the transfer material to form a synthetic image, the coefficient of the variation of the tilt of an image on the transfer material to the variation of the rotational speed is increased to minimize the variation of the rotational speed and misregistration in a tilt in a diagonal direction can be adjusted by arranging the exposure means so that the exposure means scans each photoconductor with a predetermined tilt to a perpendicular direction to the rotational direction of the photoconductor and varying the rotational speed of each photoconductor.

Figure 3:
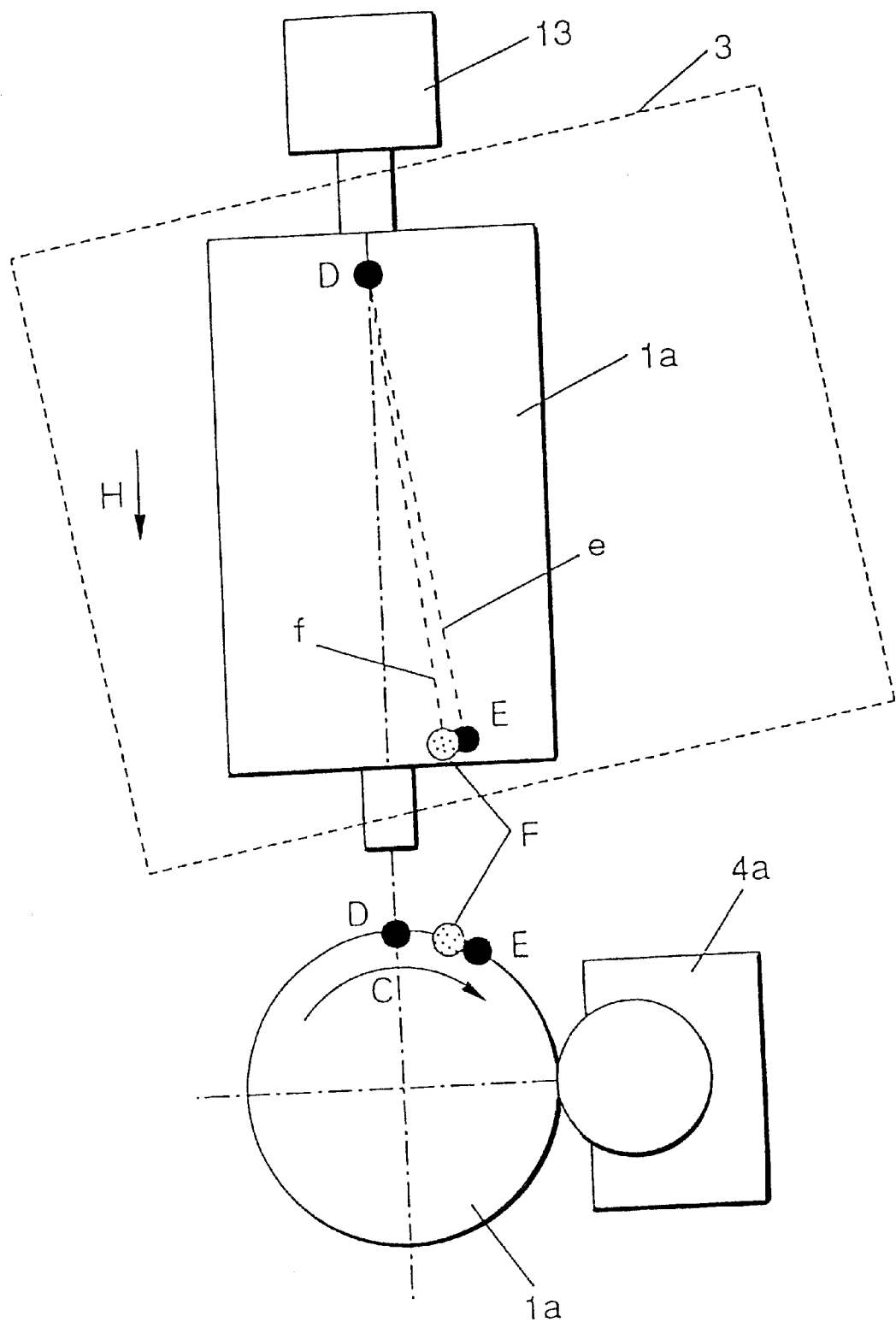
FIG. 3 is a phase diagram showing the correction of misregistration in the write area on the image carrier of the multiple image formation device equivalent to the embodiment of the present invention.

FIG. 1 is a block diagram showing a multiple image formation device equivalent to the second embodiment of the present invention, FIG. 3 is a phase diagram showing the correction of misregistration in color in a write area on the image carrier of the multiple image formation device equivalent to the second embodiment of the present invention and FIG. 4 is a phase diagram showing the correction of misregistration in color in a transfer belt area of the multiple image formation device equivalent to the second embodiment of the present invention.

As the configuration of the multiple image formation device shown in FIG. 1 is described above, the description is omitted.

A photoconductor drum 1a of a first image station Pa is rotated in a direction shown by an arrow C by a driving motor 13 as shown in FIG. 3. A latent image line e with a tilt beforehand set from a scanning start point D to a scanning end point E in a direction shown by an arrow H in black component color in image information is formed on the surface of the photoconductor drum 1a with the same peripheral speed (rotational speed) as the moving speed of the intermediate transfer belt 7 by a laser beam scanning line 3K.

If the rotational speed of the driving motor 13 is increased and the peripheral speed of the photoconductor drum 1a is faster than the moving speed (the reference speed of the photoconductor drum 1a) of the intermediate transfer belt 7, a latent image line f from the scanning start point D to the scanning end point F which is smaller in inclination than a latent image line e is formed.

Next, the latent image line f is visualized by developing means 4a and is transferred on the intermediate transfer belt 7 by transfer means 5a as shown in FIG. 4. However, as the peripheral speed of the photoconductor drum 1a is faster than the moving speed of the intermediate transfer belt 7, the inclination of a line acquired by visualizing the latent image line f shown in FIG. 3 is reduced up to the tilt of a transfer line g on the intermediate transfer belt 7. (A line f' shown in FIG. 4 shows a transfer line in case the peripheral speed of the photoconductor drum 1a and the moving speed of the intermediate transfer belt 7 are the same.) If the peripheral speed of the photoconductor drum 1a is slower than the moving speed of the intermediate transfer belt 7, the respective tilts of a latent image line and a transfer line are enlarged.

In this embodiment, the latent image line e has a tilt to a perpendicular direction to the rotational direction of the photoconductor drum 1a, however, the reason is that the coefficient of the variation of the tilt of the transfer line g on the intermediate transfer belt 7 to the variation of the peripheral speed of the photoconductor drum 1a is increased.

Considering that the transfer line g is kept at a right angle with the rotational direction of the photoconductor drum 1a even if the peripheral speed of the photoconductor drum 1a is varied in case the latent image line f is formed in a perpendicular direction to the rotational direction of the photoconductor drum 1a as shown in FIG. 3 and that as the peripheral speed of the photoconductor drum 1a is varied, the tilt of the transfer line g varies in case the latent image line f is formed with a tilt to a perpendicular direction to the rotational direction of the photoconductor drum 1a, the reason why the coefficient of the variation of the tilt becomes large is that the variation of the tilt of the transfer line g on the intermediate transfer belt 7 to the variation of the peripheral speed of the photoconductor drum 1a becomes large as the tilt of the latent image line f to a perpendicular direction to the rotational direction of the photoconductor drum 1a becomes larger.

If a line is formed with a tilt as described above, the coefficient of the variation of the tilt of an image on the intermediate transfer belt 7 to the variation of the peripheral speed of the photoconductor drum 1a can be increased, the variation of the peripheral speed of the photoconductor drum 1a can be minimized and misregistration in a tilt in a diagonal direction can be adjusted, the adjustment of the misregistration in a tilt is simplified and the cost is reduced, the adjustment of the misregistration in a tilt is further facilitated, misregistration in each pixel in case images acquired by optical scanning by the exposure means 3 are overlapped is eliminated and a high quality of image free of the deterioration of the image can be obtained.

If the latent image line e is sequentially formed on the surface of the photoconductor drum 1a from the scanning start point D to the scanning end point E in the direction shown by the arrow H by the exposure means 3 as in this embodiment and in a relative position between the exposure means 3 and the photoconductor drum 1a, the scanning end point E is on the downstream side of the scanning start point D in the rotational direction of the photoconductor drum 1a, the coefficient of the variation of the tilt of a scanning line on the intermediate transfer belt 7 to the variation of the peripheral speed of the photoconductor drum 1a becomes larger in case the peripheral speed of the photoconductor drum 1a is slower than the reference speed of the photoconductor drum 1a, compared with a case that the peripheral speed is faster.

The above is clear as shown in FIG. 3 because if the peripheral speed of the photoconductor drum 1a is faster than the reference speed of the photoconductor drum 1a, the tilt of the latent image line f is moved in a perpendicular direction to the rotational direction of the photoconductor drum 1a and that if the peripheral speed of the photoconductor drum 1a is slower than the reference speed of the photoconductor drum 1a, the tilt of the latent image line f is moved in a direction distant from a perpendicular direction to the rotational direction of the photoconductor drum 1a.

As described above, as the coefficient of the variation of the tilt of an image on the intermediate transfer belt 7 becomes large in case the peripheral speed of the photoconductor drum 1a is slow, compared with a case that the peripheral speed is fast by arranging the scanning end point E on the downstream side of the scanning start point D in the rotational direction of the photoconductor drum 1a in a relative position between the exposure means 3 and the photoconductor drum 1a and in an area in which the peripheral speed of the photoconductor drum 1a is slower than the reference speed of the photoconductor drum 1a, the peripheral speed of the photoconductor drum 1a is varied, misregistration in a tilt in a diagonal direction can be adjusted in an area in which the load torque of a driving source for rotating the photoconductor drum 1a is small and a high quality of image is obtained.

In the meantime, if the latent image line e is formed conversely to that in this embodiment and in a relative position between the exposure means 3 and the photoconductor drum 1a, the scanning end point E is on the upstream side of the scanning start point D in the rotational direction of the photoconductor drum 1a, the coefficient of the variation of the tilt of a scanning line on the intermediate transfer belt 7 to the variation of the peripheral speed of the photoconductor drum 1a becomes larger in case the peripheral speed of the photoconductor drum 1a is faster than the reference speed of the photoconductor drum 1a, compared with a case that the peripheral speed is slower.

The reason is that if the peripheral speed of the photoconductor drum 1a is slower than the reference speed of the photoconductor drum 1a, the tilt of the latent image line f is moved in a perpendicular direction to the rotational direction of the photoconductor drum 1a and if the peripheral speed of the photoconductor drum 1a is faster than the reference speed of the photoconductor drum 1a, the tilt of the latent image line f is moved in a direction distant from a perpendicular direction to the rotational direction of the photoconductor drum 1a.

As described above, as the coefficient of the variation of the tilt of an image on the intermediate transfer belt 7 becomes large by arranging the scanning end point E on the upstream side of the scanning start point D in the rotational direction of the photoconductor drum 1a in a relative position between the exposure means 3 and the photoconductor drum 1a in case the peripheral speed of the photoconductor drum 1a is fast, compared with a case that the peripheral speed is slow, misregistration in a tilt in a diagonal direction can be adjusted in an area in which the peripheral speed of the photoconductor drum 1a is faster than the moving speed at which transfer efficiency is enhanced of the intermediate transfer belt 7 and the peripheral speed of the photoconductor drum 1a is varied in an area in which the peripheral speed is faster than the moving speed of the intermediate transfer belt 7, misregistration in a tilt in a diagonal direction can be adjusted with tension always applied to the intermediate transfer belt 7 and a high quality of image is obtained.

For a cyan image, a magenta image and a yellow image, the images are also formed by varying the tilt of a transfer line by the similar method and toner images in four colors are formed on the intermediate transfer belt 7.

As described above, the peripheral speed of each photoconductor drum 1a, 1b, 1c, 1d is varied by varying the tilt of a transfer line so that the tilt of each transfer line of color images is equal and misregistration in a tilt is corrected. For example, the peripheral speed of the other photoconductor drums 1b, 1c, 1d is independently varied to match with the inclination of the transfer line g on the photoconductor drum 1a, the quantity of misregistration is corrected by adjusting so that each inclination is equal and the overlap of toner images in four colors free of misregistration in color on the intermediate transfer belt is completed.

INDUSTRIAL AVAILABILITY

As described above, according to the present invention, as speed adjustment means for varying the rotational speed of each image carrier is provided, an inclined angle in a diagonal direction can be varied by independently varying the speed of each image carrier and misregistration in a tilt in a diagonal direction can be adjusted, the configuration of color misregistration correction means can be simplified, the cost can be reduced and further, misregistration in color can be readily adjusted.

Also, as misregistration in a tilt in a diagonal direction can be adjusted with the coefficient of the variation of the rotational speed of the image carrier to transfer material minimized by varying the rotational speed of the image carrier based upon the moving speed of the transfer material, the disturbance of an image due to friction between the image carrier and the transfer material can be minimized.

Also, as misregistration in a tilt in a diagonal direction can be adjusted with tension always applied to transfer material by varying the rotational speed of the image carrier in an area in which the rotational speed is faster than the moving speed of the transfer material, the disturbance of an image due to the deflection of the transfer material can be inhibited.

In the meantime, according to the present invention, the coefficient of the variation of the tilt of an image on transfer material to the variation of the rotational speed is increased, the variation of the rotational speed is minimized, misregistration in a tilt in a diagonal direction can be adjusted, the adjustment of misregistration in a tilt is simplified, the cost is reduced, further, misregistration in a tilt can be readily adjusted, misregistration in each pixel in case images optically scanned by plural exposure means are overlapped is eliminated and a high quality of image free of the deterioration of the image can be obtained by arranging the exposure means so that the exposure means scans the photoconductor with a predetermined tilt in a perpendicular direction to the rotational direction of the photoconductor, providing speed adjustment means for varying the rotational speed of the respective photoconductors and varying the rotational speed of each photoconductor.

Also, as the exposure means scans by sequentially radiating a light beam in a direction tilted by predetermined quantity in a perpendicular direction to the rotational speed of the photoconductor, the end point of scanning is on the downstream side of the start point in the rotational direction of the photoconductor in a relative position between the exposure means and the photoconductor, the coefficient of the variation of the tilt of an image on transfer material becomes large in case the rotational speed of the photoconductor is slow, compared with a case that the rotational speed is fast and the rotational speed of plural photoconductors is varied in an area in which the rotational speed of the plural photoconductors is slower than the reference speed of the photoconductor, misregistration in a tilt in a diagonal direction can be efficiently adjusted in an area in which the load torque of the driving source for rotating the photoconductor is small and a high quality of image is obtained.

Also, as the exposure means scans by sequentially radiating a light beam in a direction tilted by predetermined quantity in a perpendicular direction to the rotational speed of the photoconductor, the end point of scanning is on the upstream side of the start point in the rotational direction of the photoconductor in a relative position between the exposure means and the photoconductor, the coefficient of the variation of the tilt of an image on transfer material becomes large in case the rotational speed of the photoconductor is fast, compared with a case that the rotational speed is slow, misregistration in a tilt in a diagonal direction can be adjusted in an area in which the rotational speed of the photoconductor is faster than the moving speed at which transfer efficiency is enhanced of the transfer material and the rotational speed of the plural photoconductors is varied in an area in which the rotational speed is faster than the moving speed of the transfer material, misregistration in a tilt in a diagonal direction can be adjusted with tension always applied to the transfer material and a high quality of image is obtained.

What is claimed is:

1. A multiple image formation device comprising:

plural photoconductors;

exposure means for radiating a light beam on said each photoconductor to form a latent image and scanning said photoconductor with a predetermined tilt relative to a perpendicular direction to a rotational direction of said photoconductor;

plural developing means for respectively developing the latent image formed on said each photoconductor;

transfer means for transferring the image developed by said developing means on a transfer material; and speed adjustment means for varying a rotational speed of said photoconductor so as to adjust the tilt of the latent image, wherein:

a synthetic image is formed by sequentially overlapping the images developed on said each photoconductor on the transfer material.

2. A multiple image formation device according to claim 1, wherein:

said exposure means scans by sequentially radiating the light beam in a direction tilted by a predetermined quantity relative to the perpendicular direction to the rotational direction of said photoconductor; and in a relative position between said exposure means and said photoconductor, an end point of scanning is on a downstream side of a start point in the rotational direction of said photoconductor.

3. A multiple image formation device according to claim 1, wherein;

said exposure means scans by sequentially radiating the light beam in a direction titled by a predetermined quantity relative to the perpendicular direction to the rotational direction of said photoconductor; and in a relative position between said exposure means and said photoconductor, an end point of scanning is on an upstream side of a start point in the rotational direction of said photoconductor.

* * * * *